(12) United States Patent
Chen et al.

(10) Patent No.: US 8,341,227 B2
(45) Date of Patent: Dec. 25, 2012

(54) PLAYBACK OF INSTANT MESSAGING SESSION HISTORY

(75) Inventors: Yen-Fu Chen, Austin, TX (US); John Hans Handy-Bosma, Cedar Park, TX (US); Mei Yang Selvage, Pocatello, ID (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 12/058,649

(22) Filed: Mar. 28, 2008

(65) Prior Publication Data
US 2008/0177853 A1 Jul. 24, 2008

Related U.S. Application Data

(63) Continuation of application No. 11/260,565, filed on Oct. 27, 2005, now abandoned.

(51) Int. Cl.
*G06F 15/16* (2006.01)
(52) U.S. Cl. ......... 709/206; 709/204; 709/205; 709/246
(58) Field of Classification Search .................. 709/204, 709/205, 206, 246
See application file for complete search history.

(56) References Cited

U.S. PATENT DOCUMENTS

| | | | |
|---|---|---|---|
| 5,339,388 A | | 8/1994 | Bates et al. |
| 5,339,389 A | | 8/1994 | Bates et al. |
| 6,144,991 A | * | 11/2000 | England ........................ 709/205 |
| 6,177,941 B1 | | 1/2001 | Haynes et al. |
| 6,693,648 B1 | | 2/2004 | Lyndon |
| 7,099,798 B2 | | 8/2006 | Yu et al. |
| 7,197,122 B2 | * | 3/2007 | Vuori .......................... 379/88.25 |
| 7,895,263 B1 | * | 2/2011 | Kirchmeier et al. .......... 709/203 |
| 2002/0184313 A1 | * | 12/2002 | Bedos et al. ................... 709/205 |
| 2003/0131050 A1 | | 7/2003 | Vincent |
| 2003/0225832 A1 | * | 12/2003 | Ludwig ........................ 709/204 |
| 2004/0169639 A1 | | 9/2004 | Pate et al. |
| 2004/0179036 A1 | | 9/2004 | Teplov et al. |
| 2005/0081160 A1 | | 4/2005 | Wee et al. |

(Continued)

OTHER PUBLICATIONS

Bengel et al., "Archiving and Indexing Chat Utterances", 2003, retrieved from http://citeseerx.ist.psu.edu/viewdoc/summary?doi=10.1.1.5.7202 on Apr. 19, 2010.*

(Continued)

*Primary Examiner* — Liangche A Wang
(74) *Attorney, Agent, or Firm* — Garg Law Firm, PLLC; Rakesh Garg; Mark C. Vallone

(57) ABSTRACT

Systems, methods and media for playback of instant messaging session history in an instant messaging system by facilitating recording and playback of an instant messaging session history to a user are disclosed. Embodiments may include, during an instant messaging session where one or more instant messaging events occur, determining a timestamp associated with the one or more instant messaging events and recording an indication of the one or more instant messaging events and their associated timestamps. Embodiments may also include receiving one or more playback commands and, in response to the received playback commands, displaying playback of the one or more instant messaging events based on their associated timestamps. The instant messaging events may include one or more of a text message, file transfer, input device movement, or a status indication such as offline, returned from offline, away, returned from away, secure session established, session beginning or session ending.

17 Claims, 7 Drawing Sheets

U.S. PATENT DOCUMENTS

2005/0086230 A1    4/2005    Frees et al.
2006/0089820 A1*    4/2006    Yu et al. .......................... 702/186
2011/0041085 A1*    2/2011    Hardebeck et al. ........... 715/753

OTHER PUBLICATIONS

Final Office Action of U.S. Appl. No. 11/260,564 (Assignee's abandoned application), Apr. 10, 2009, USPTO, Alexandria, VA, USA.

Applicant's attorney Jim Nickelson, Response to Non-Final Office Action of U.S. Appl. No. 11/260,564 (Assignee's abandoned application), Jan. 27, 2009, Austin, TX, USA.

Terminal Dislciamer of U.S. Appl. No. 11/260,564 in view of U.S. Appl. No. 12/058,645.

Non-Final Office Action of U.S. Appl. No. 11/260,564 (Assignee's abandoned application), Oct. 27, 2008, USPTO, Alexandria, VA, USA.

Non-Final Office Action of U.S. Appl. No. 11/260,565 (abandoned parent of instant application), Mar. 4, 2009, USPTO, Alexandria, VA, USA.

Applicant's attorney Erik Osterrieder, Response to Non-Final Office Action of U.S. Appl. No. 12/058,645, Aug. 4, 2010, Austin, TX, USA.

Non-Final Office Action of U.S. Appl. No. 12/058,645, May 4, 2010, USPTO, Alexandria, VA, USA.

Applicant's attorney Jim Nickelson, Second Preliminary Amendment of U.S. Appl. No. 12/058,645, Jul. 6, 2009, Austin, TX, USA.

* cited by examiner

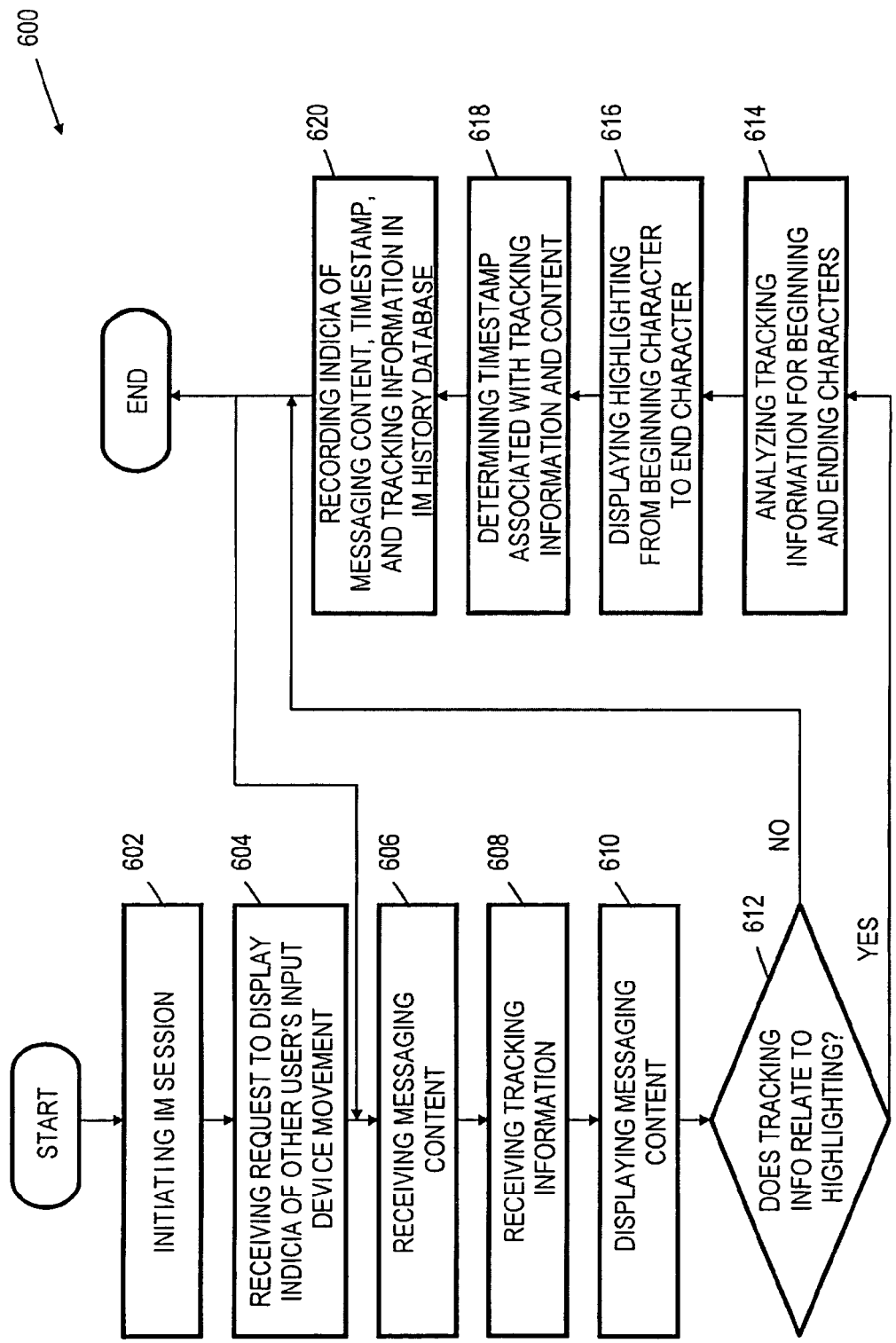

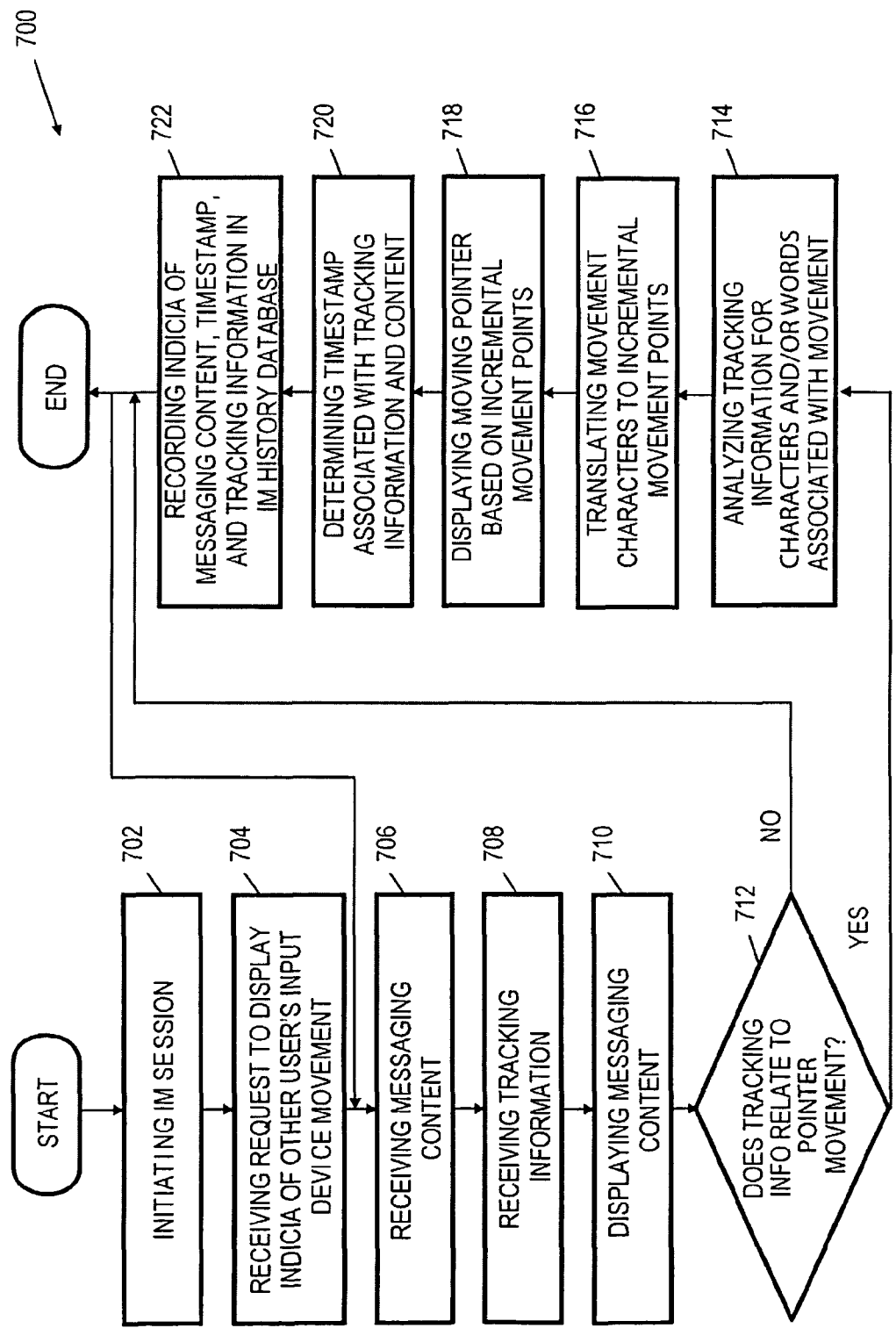

PLAYBACK OF INSTANT MESSAGING SESSION HISTORY

CROSS-REFERENCES TO RELATED APPLICATIONS

Pursuant to 35 USC §120, this continuation application claims priority to and benefit of U.S. patent application Ser. No. 11/260,565, entitled "SYSTEMS, METHODS, AND MEDIA FOR PLAYBACK OF INSTANT MESSAGING SESSION HISTORY", filed on Oct. 27, 2005 now abandoned, the disclosure of which is incorporated herein in its entirety for all purposes.

FIELD OF INVENTION

The present invention is in the field of data processing systems and, in particular, to systems, methods and media for playback of instant messaging session history in an instant messaging system by facilitating recording and playback of an instant messaging session history to a user.

BACKGROUND

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM or DVD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. The use of mobile computing devices, such as notebook PCs, personal digital assistants (PDAs), sophisticated wireless phones, etc., has also become widespread. Mobile computing devices typically exchange some functionality or performance when compared to traditional PCs in exchange for smaller size, portable power, and mobility.

The widespread use of PCs and mobile computing devices in various segments of society has resulted in a reliance on computer systems both at work and at home, such as for telecommuting, news, stock market information and trading, banking, shopping, shipping, communication in the form of hypertext transfer protocol (http) and e-mail, as well as other services. Many of these functions take advantage of the communication abilities offered by the Internet or other networks, such as local area networks.

A computer system application that continues to increase in popularity is instant messaging (IM). IM systems allow two or more users on computer systems such as PCs or mobile computing devices to exchange messages in real-time (or near real-time). IM systems allow users to maintain a list of other users, called a buddy or contact list, with whom they wish to interact. Using the IM system, a user can send an instant message to any person on their contact list as long as that person is on-line. Sending a message to an on-line user opens up an instant messaging window where each user may type messages that the other user may see, allowing for an electronic "conversation". The instant messaging window typically includes both text input by the user as well as received messages, with new content typically appearing at the bottom of the window as older content scrolls upwards in the window. Many IM systems also provide chat room capability, where a user can set up a chat room to be shared by multiple users. The chat room operates under the same principles as basic instant messaging applied to multiple users, as each user may type in messages for other users in the chat room to see. Existing IM systems include Time Warner, Inc.'s AOL® Instant Messenger™, (AIM), Microsoft® Corporation's MSN Messenger™, and Yahoo! Inc.'s Yahoo!(D Messenger™.

IM systems allow users to exchange text messages as well as files such as sounds, video, or pictures. The popularity of IM systems is partially based on the immediacy of IM systems, particularly when compared to e-mail. This immediacy typically requires both parties in an IM exchange to be on-line at the same time, in contrast to e-mail. It allows, however, for interactive, back-and-forth exchanges of information without having to perform multiple steps to read, reply, and send a reply e-mail. By ensuring that the recipient of a message is available when a message is sent, the message can be delivered and presented to the recipient nearly instantly (as network conditions allow).

While IM systems continue to increase in popularity, existing IM systems do not provide an efficient and effective mechanism for a user to review the real-time performance of an IM session or chat (such as aspects of speed or frequency of messaging) after termination of the session. Some IM systems provide a transcript of an IM session that includes the text of the conversation, but such a transcript lacks the context of the frequency or speed of messaging. There is, therefore, a need for an easy and effective system to facilitate review of the performance of an IM session or chat.

SUMMARY OF THE INVENTION

The problems identified above are in large part addressed by systems, methods and media for playing back an instant messaging session. Embodiments may include, during an instant messaging session where one or more instant messaging events occur, determining a timestamp associated with the one or more instant messaging events and recording an indication of the one or more instant messaging events and their associated timestamps. Embodiments may also include receiving one or more playback commands and, in response to the received playback commands, displaying playback of the one or more instant messaging events based on their associated timestamps. The instant messaging events may include one or more of a text message, a file transfer, an input device movement, a session beginning or a session ending.

Another embodiment provides a machine-accessible medium containing instructions effective, when executing in a data processing system, to cause the system to perform a series of operations for playing back an instant messaging session. The series of operations generally includes, during an instant messaging session where one or more instant messaging events occur, determining a timestamp associated with the one or more instant messaging events and recording an indication of the one or more instant messaging events and their associated timestamps. The series of operations may also include receiving one or more playback commands and, in response to the received playback commands, displaying playback of the one or more instant messaging events based on their associated timestamps.

A further embodiment provides a client computer system of an instant messaging system. The client computer system may include a communications module to send and receive information to and from a second client computer system and an instant messaging client to initiate an instant messaging session with the second client computer system via the communications module and to send and receive one or more instant messaging events as part of an instant messaging session. The client computer system may also include an instant messaging history module to record a history of the instant messaging session, where the instant messaging history module may also playback the recorded instant messaging session history.

BRIEF DESCRIPTION OF THE DRAWINGS

Other objects and advantages of the invention will become apparent upon reading the following detailed description and upon reference to the accompanying drawings in which, like references may indicate similar elements:

FIG. 6 depicts an example of a flow chart for receiving highlighting tracking information from another client computer system, displaying an equivalent movement to a user, and recording the equivalent movement in an IM history database according to one embodiment; and FIG. 7 depicts an example of a flow chart for receiving pointer movement tracking information from another client computer system, displaying an equivalent movement to a user, and storing the equivalent movement in an IM history database according to one embodiment.

DETAILED DESCRIPTION OF EMBODIMENTS

Figure 1:
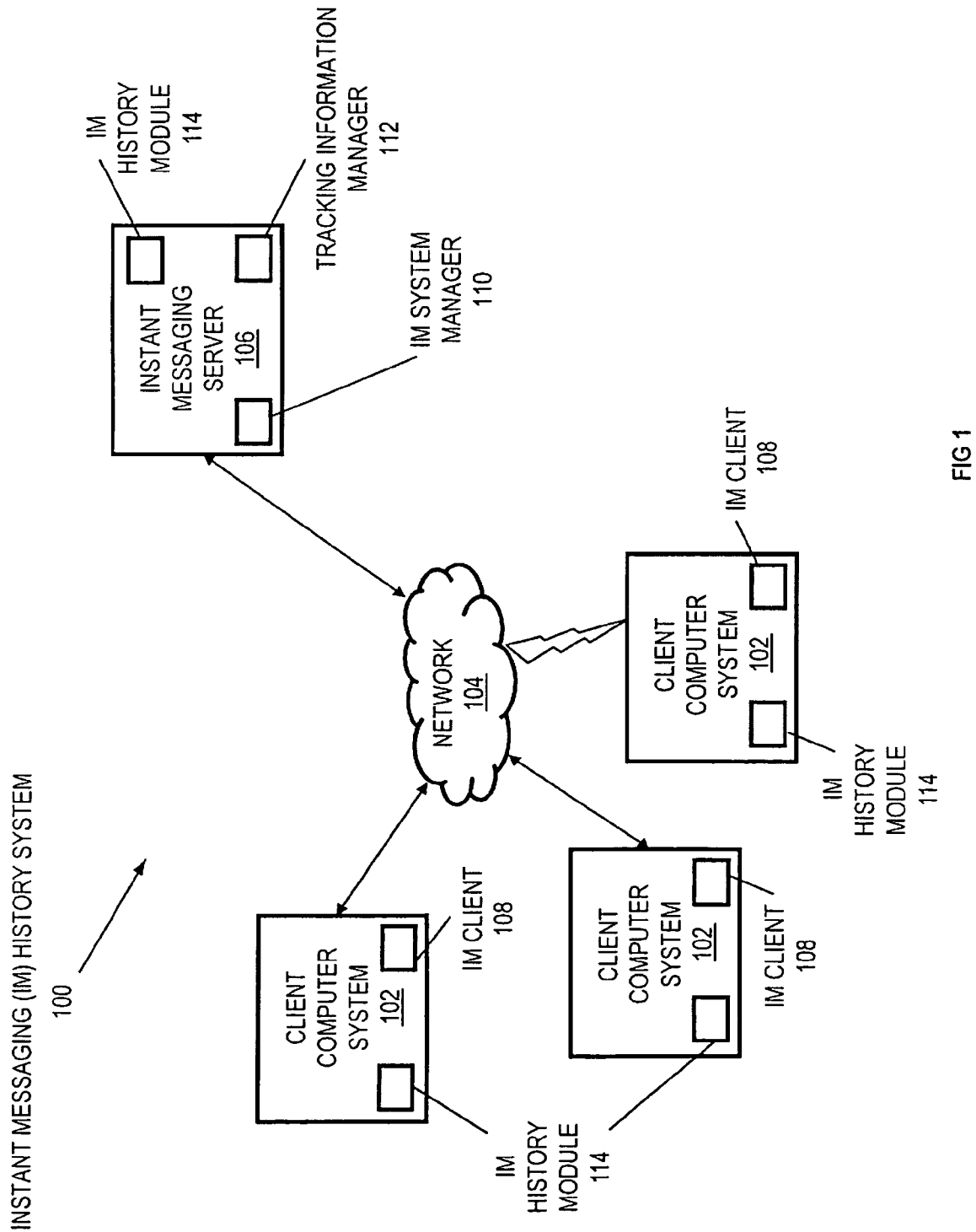
FIG. 1 depicts an environment for an instant messaging history system for recording and playback of instant messaging history according to one embodiment.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for playback of instant messaging session history in an instant messaging system by facilitating recording and playback of an instant messaging session history to a user are disclosed. Embodiments may include, during an instant messaging session where one or more instant messaging events occur, determining a timestamp associated with the one or more instant messaging events and recording an indication of the one or more instant messaging events and their associated timestamps. Embodiments may also include receiving one or more playback commands and, in response to the received playback commands, displaying playback of the one or more instant messaging events based on their associated timestamps. The instant messaging events may include one or more of a text message, a file transfer, an input device movement, or a status indication such as offline, returned from offline, away, returned from away, secure session established, secure session error, other error, a session beginning or a session ending.

The system and methodology of the disclosed embodiments allows users to record and playback histories of instant messaging sessions, including a history of any text messages, file transfers, status indications, or input device movements. By playing back the history of an instant messaging session, a user may be able to experience the feel or flow of the session in a way that a simple transcript cannot accomplish. The disclosed system may also be particularly useful when input device movements such as highlighting or pointer movements are shared, as these movements can be recreated during the playback and provide another dimension to the history. As will be described in more detail subsequently, the disclosed systems and methodologies provide an efficient and effective mechanism for a user to view playbacks of an IM session.

While specific embodiments will be described below with reference to particular configurations of hardware and/or software, those of skill in the art will realize that embodiments of the present invention may advantageously be implemented with other substantially equivalent hardware and/or software systems. Aspects of the invention described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the invention are also encompassed within the scope of the invention.

Turning now to the drawings, FIG. 1 depicts an environment for an instant messaging history system for recording and playback of instant messaging history according to one embodiment. In the depicted embodiment, the instant messaging (IM) history system 100 includes a plurality of client computer systems 102 in communication with a network 104. The IM history system 100 may also include an IM server 106 in communication with network 104 for managing the instant messaging system. In the IM history system 100, the client computer systems 102 and the IM server 106 may be located at the same location, such as in the same building or computer lab, or could be remote. While the term "remote" is used with reference to the distance between the components of the IM history system 100, the term is used in the sense of indicating separation of some sort, rather than in the sense of indicating a large physical distance between the systems. For example, any of the components of the IM history system 100 may be physically adjacent or located as part of the same computer system in some network arrangements.

Client computer system 102 may include one or more personal computers, workstations, servers, mainframe computers, notebook or laptop computers, desktop computers, PDAs, set-top boxes, mobile phones, wireless devices, or the like. In some embodiments, client computer system 102 may be a computer system as described in relation to FIG. 2. The client computer system 102 may be in wired or wireless communication with network 104. Each client computer system 102 may include an IM client 108, which may be a software application that communicates with the IM server 106 to facilitate instant messaging by a user of the client computer system 102 with another user. In this embodiment, the IM client 108 may transmit information, such as messaging content, status information, or input device movement information, to the IM server 106, which in turn may forward it to a recipient client computer system 102. The IM client 108 may receive information as well, such as messaging content, status information, or tracking information, from the IM server 106. Alternatively, the IM clients 108 of different client computer systems 102 may communicate with each other directly instead of communicating through the IM server 106.

Each client computer system 102 may also include an IM history module 114. The IM history module 114 may record an indication of the history of an instant messaging session, such as by saving or storing an indication of instant messaging events and an associated timestamp for each event. An IM session may include any type of instant messaging session, including multi-party IM chats. Instant messaging events may include any type of event during an instant messaging session, including the beginning or termination of the session, status and error messages, text messages or other communications between users, the transfer of files (e.g., sounds, video, text, etc.) between users, an indication of input device movements, audio, video, etc. Status information may include an offline indication, a returned from offline indication, an away indication, a returned from away indication, a secure session established indication, a secure session error indication, an other error indication, a session beginning, a session ending, or any other status information. The IM history module 114 may also facilitate playback of the instant messaging session to a user, such as by receiving playback commands from a user and displaying the requested portion of the IM session to the user. As will be described in more detail subsequently, the IM history module 114 may advantageously allow a user to view a playback of all or part of an IM session, including the timing of communications, status changes, input device movements, file transfers, etc., providing an effective mechanism to view the performance of an IM session.

Network 104 may be any type of data communications channel, such as the Internet, an intranet, a LAN, a WAN, an Ethernet network, a wireless network, a proprietary network, or a broadband cable network. Many instant messaging systems, such as ICQ, utilize the Internet and are open to all. Other IM systems, such as AIM™, use proprietary networks, while others such as MSN Messenger™ use semi-private networks. Those skilled in the art will recognize, however, that the invention described herein may be implemented utilizing any type of data communications channel.

The IM server 108 may be executing on one or more personal computers, workstations, servers, mainframe computers, notebook or laptop computers, desktop computers, or the like. In some embodiment, the IM server 108 may be a computer system as described in relation to FIG. 2. An example IM server 108 is an International Business Machine Corporation (IBM) eServer® server. In one embodiment, the IN server 106 may include an IM system manager 110 to facilitate instant messaging between IM clients 108 on different client computer systems 102 by transmitting and receiving information, such as the identification, status, and/or network address of IM clients 108 and/or client computer systems 102, messaging content, or information relating to movement of user input devices. Many different IM system manager 110 applications exist, such as ICQ, AIM™, MSN Messenger™, Yahoo!® Messenger™, Jabber, etc.

In an alternative embodiment, the IM server 106 may include an IM history module 114 similar to that of the client computer system 102. The IM history module 114 of the IM server 106 may record the history of multiple IM sessions for later playback, archiving, or analysis. In this embodiment, a user of a client computer system 102 may access a playback of an IM session history by requesting such playback form the IM history module 114 of the IM server 106 instead of a local IM history module 114. The IM history system 100 may include IM history modules 114 at either or both of the client computer systems 102 and IM server 106.

In another alternative embodiment, the IM server 106 may also optionally include a tracking information manager 112 when input device movements are transmitted as part of the IM session. The tracking information manager 112 may receive, transmit, and/or analyze tracking information relating to input device movement by a user involved in an IM session. For example, the tracking information manager 112 may receive tracking information from a sending IM client 108, optionally analyze or otherwise process it, and then transmit the tracking information to a recipient IM client 108. A tracking information manager 112 may not be needed if, for example, the tracking information is handled in the same fashion as messaging content or if two client computer systems 102 are in direct communication without the IM server 106 being involved. The tracking information manager 112 may thus allow two users utilizing IM clients 108 on different client computer systems 102 to share input device movements between them. During an IM session, for example, a client computer system 102 may (such as upon request of the user) receive user input from a user input device representing movement of a pointer or other representation of the input device in the instant messaging window of that user's IM client 108. The user may, for example, point out text from a few lines back in the history with a gesture of their mouse or highlight earlier text with the mouse. The client computer system 102 may then convert that input into tracking information for transmission and use by a recipient client computer system 102. The recipient client computer system 102 may then use the tracking information to determine an equivalent movement for the open window of its IM client 108 and then to display that equivalent movement to the user in the instant messaging window. If the first user highlighted text with her mouse, for example, the same text would be highlighted in the instant messaging window for the second user. In another example, if the first user used their mouse to circle a word or point to a portion of the window, such gesture or motion would be repeated in the second user's window. In this way, a user may simply highlight or point her mouse towards particular text in the instant messaging window and have an equivalent motion be performed for the person with whom they are communicating.

The systems and methodologies of the disclosed embodiments provide an efficient and effective mechanism for a user to view the performance of an IM session after the session has completed. By recording a history of an IM session, a user may playback all or part of the IM session to view the occurrence of IM events during real-time. In many cases, viewing the occurrence of IM events may give a user more insight or information than a simple transcript. A user, for example, could infer hesitation by the other user in noticing a delayed response to a query. The disclosed systems may also be particularly useful when gestures or other input device movement information is shared as part of an IM session. The disclosed system allows a user to view gestures, highlighting, pointer movement or other input device movement during the playback, which may significantly enhance the value of the playback experience. A student viewing a class held as an IM session could, in this example, review the class at a later time complete with pointer movements made by the professor, allowing the user to experience the class as it was initially performed instead of viewing a static transcript. In another example, the disclosed system may provide value when one user responds to a first question from another user shortly after a second question is posed, making it appear on a transcript that the responding user responded to the second question instead of the first question. Using the disclosed system, a playback of the questions and answers will make it clear the responding user was responding to the first question.

Figure 2:
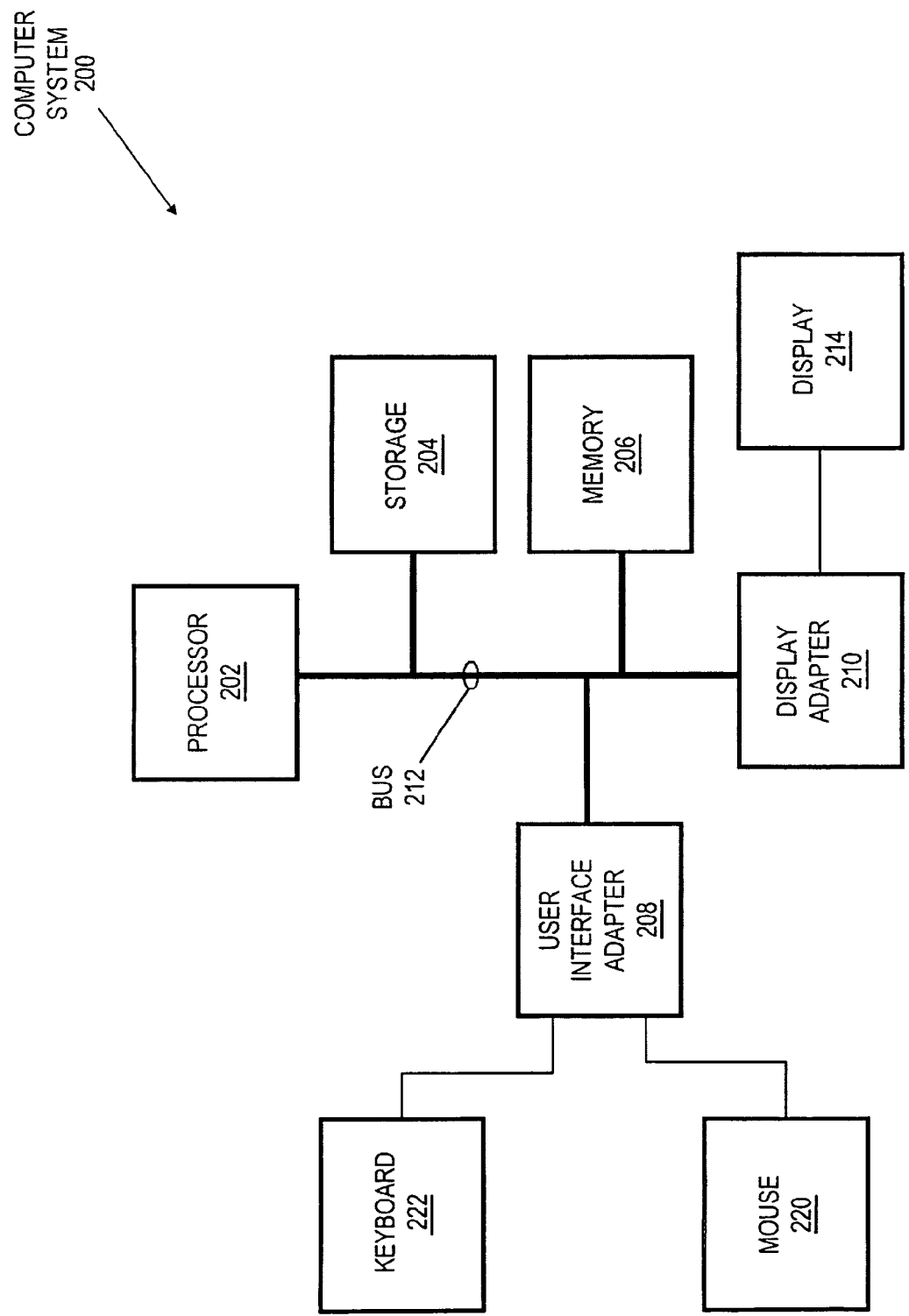
FIG. 2 depicts a block diagram of one embodiment of a computer system suitable for use as a component of the IM history system.

FIG. 2 depicts a block diagram of one embodiment of a computer system 200 suitable for use as a component of the IM history system 100, such as a client computer system 102 or an IM server 106. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 212. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM).

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. The bus 212 may also connect the processor 202 to a display 214, such as an LCD display or CRT monitor, via the display adapter 210.

Figure 3:
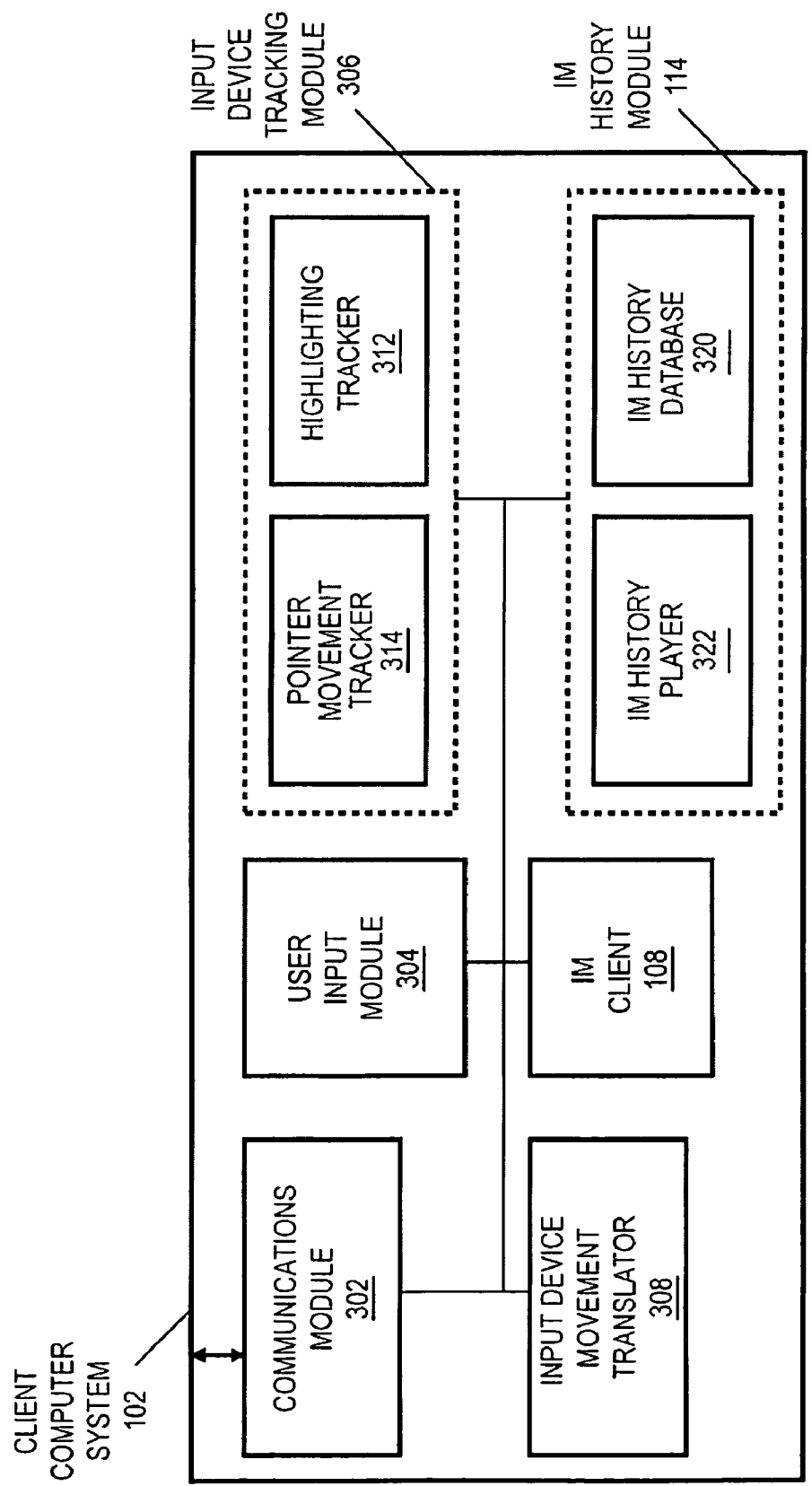
FIG. 3 depicts a conceptual illustration of software components of a client computer system of the IM history system according to one embodiment.

FIG. 3 depicts a conceptual illustration of software components of a client computer system of the IM history system according to one embodiment. The client computer system 102 of the depicted embodiment includes an IM client 108, an IM history module 114, a communications module 302, and a user interface module 304. The client computer system 102 may also include an optional input device tracking module 306 and input device movement translator 308 when input device movement is being tracked during an IM session. The IM client 108 may initiate IM sessions, receive and transmit user authentication information (i.e., password and ID), provide for the transmission and receipt of messaging content during the IM session, maintain contact lists of other users associated with other IM clients 108, encrypt or decrypt communications, or perform other tasks associated with instant messaging. As will be described in more detail subsequently, the IM history module 114 of the disclosed embodiments may also record and playback to a user a history of an IM session.

The IM client 108 may utilize the communications module 302 to facilitate communications to and from an IM server 106 and/or the IM clients 108 of other client computer systems 102 via network 104. The user interface module 304 may receive user input from user input devices such as a mouse 220 or keyboard 222 and may transmit an indication of the received input to other components of the client computer system 102, such as the IM history module 114. The user interface module 304 may, through display adapter 210, also display the contents of an IM session either live or as a playback using display 214. Alternatively, the user interface module 304 may use audio, print, or other output in lieu of using a display 214.

The IM history module 114 may include sub-modules such as an IM history player 322 and an IM history database 320 to perform various tasks. The IM history database 320 may store the history of any IM sessions performed by the IM client 108. In one embodiment, IM session histories are only stored at user request, but in other embodiments IM session histories may be stored by default, based on user configurations, or any other methodology. The IM history database 320 may also store a timestamp associated with each IM event in an IM history. For example, the IM history module 114 may store a timestamp for each text communication, input device movements, file transfers, or other IM events in the IM history database 320.

The IM history player 322 may playback some or all of an IM session to a user so that they can view the history of the IM session. In embodiments where input device movement is part of the recorded playback, the IM history player 322 may translate the input device movements as necessary to accommodate the size or configuration of the playback window. To accomplish the playback, the IM history player 322 may access the stored IM history in the IM history database 320 and then playback an IM session in 'real-time' in a playback window. The IM history player 322 may playback the session at the same speed at which it was first performed, or it may playback the session at a faster or slower rate based upon user preference, user request, or its own algorithms. The IM history player 322 may, for example, playback long periods of inactivity at an accelerated rate as periods of inactivity may provide little value to the user. Similarly, in another example, the IM history player 322 may play periods of high activity during the IM session at a slower rate so that the user may view the details more easily. The IM history player 322 may offer any type of command to users, such as selecting IM histories for review, play, fast forward, rewind, stop, speed of review, bookmarking portions of the IM history, etc. In one example, a user may request the IM history player 322 to begin playing at the $32^{nd}$ minute of an IM session. The IM history player 322 may then skip to the $32^{nd}$ minute of the session and begin playing back the IM session from that point (by accessing the saved session). The subsequent text messages (and any movements or other events) would then be displayed to the user at the same timing and frequency at which they originally occurred. The user in this example could also request that the playback be accelerated or decelerated. One skilled in the art will recognize that user control of the playback may be accomplished in any fashion.

While the IM history player 322 and IM history database 320 are depicted in FIG. 3 as part of an IM history module 114 as part of a single client computer system 102, other alternatives are possible. In some embodiments, for example, the IM history database 320 may be located at a central database (such as at an IM server 106) that is accessed by an IM history player 322 located at a client computer system 102. In another example, the IM history database 320 and the IM history player 322 may be located on separate client computer systems 102, such as if a user had a PDA with a IM history player 322 that accessed an IM history database 320 stored on their home personal computer.

In some embodiments, the IM history system 100 may provide for tracking input device movements during IM sessions, requiring the use of an input device tracking module 306 and/or an input device movement translator 308 for the client computer system 102. The input device tracking module 306 may determine that the movement of an input device should be tracked and may also track the input device movement signals received by the user interface module 304. Once input device movement tracking is initiated, the input device tracking module 306 (through the use of its sub-modules, described subsequently) may determine tracking information based on the received input device movement information for transmission to another client computer system 102 and/or IM client 108.

The input device tracking module 306 may include one or more sub-modules to track the input device movement and to determine tracking information based on the movement. In the disclosed embodiment, the input device tracking module 306 includes a highlighting tracker sub-module 312 and a pointer movement tracker sub-module 314. The highlighting tracker sub-module 312 may track highlighting of text by a user in an instant messaging window. In some embodiments, a user may highlight text by actuating and holding the left-mouse button of their mouse 220 and using the mouse 220 to 'drag' over the text to be highlighted. When a user highlights text in their IM window, the highlighting tracking sub-module 312 may, in one embodiment, track such a movement by determining the first and last characters that are highlighted (with all characters in between the first and last characters also being highlighted). The tracking information in this environment may be the location or identity of the first and last highlighted characters (e.g., from the $5^{th}$ character to the $37^{th}$ character), as well as additional information about the highlighting such as a special emphasis (e.g., different color, font, size, etc.). Another client computer system 102 according to the disclosed system may receive the tracking information and display an indication of that highlighting in its own IM window, thus allowing the users to share the highlighting information.

The pointer movement tracker sub-module 314 may track mouse movement by a user in an instant messaging window to determine tracking information for use by another client computer system 102 and/or IM client, 108. In some embodiments, a user may move the mouse 220 or other pointing device (e.g., a finger on a touch-screen display, a joystick, a trackball, voice commands, etc.) to cause gestures of a pointer in the instant messaging window. For example, a user may use the mouse 220 to point to a word with the pointer, point to a block of text, emphasize a portion of their open window, gesture a connection between two chat lines, move the pointer back and forth over a word or group of words, or otherwise try to communicate with movement of the pointer. The pointer movement tracker sub-module 314 may receive these input device movements and determine tracking information based on them for use by another client computer system 102 and/or IM client 108. In some embodiments, the pointer movement tracker sub-module 314 may determine the tracking information by determining the beginning and end characters of a movement (and optionally the speed of that movement).

The input device movement translator 308 may receive tracking information from another client computer system 102 and/or IM client 108 to translate that into display commands for displaying an equivalent movement to a user of the recipient client computer system 102. As such, the input device movement translator 308 need only execute on a client computer system 102 on which equivalent movements based on tracking information from another client computer system 102 are displayed. In contrast, the input device tracking module 306 need only be located on a client computer system 102 that is the source of tracking information, and a particular client computer system 102 may include either or both of the input device tracking module 306 and the input device movement translator 308. The input device movement translator 308 may translate any received tracking information into equivalent movement commands for display to a user. A user with a client computer system 102 equipped with an input device movement translator 308 may thus view movements such as highlighting or pointer movements from another user in their instant messaging window.

Figure 4:
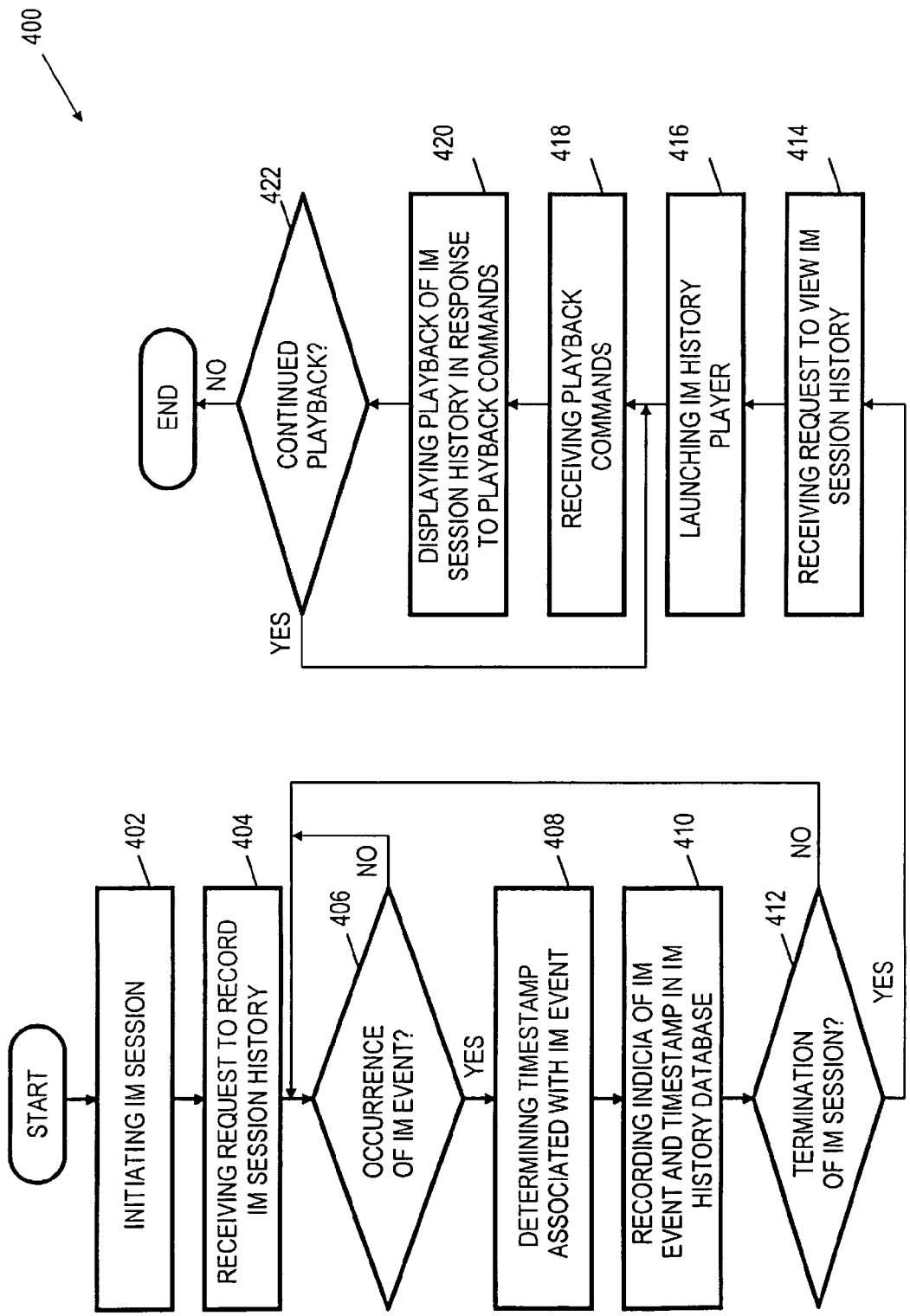
FIG. 4 depicts an example of a flow chart for recording an IM session history and displaying a playback of the IM session history to a user according to one embodiment.

FIG. 4 depicts an example of a flow chart 400 for recording an IM session history and displaying a playback of the IM session history to a user according to one embodiment. The method of flow chart 400 may be performed, in one embodiment, by a client computer system 102 with an IM history module 114. Flow chart 400 begins with element 402, where an IM client 108 may initiate an instant messaging session to start an instant messaging 'conversation'. The IM client 108 may, in one embodiment, initiate the session when a user of the IM client 108 either selects a contact with whom they desire to start a session or affirmatively responds to a request for a session from another user. At optional element 404, the IM history module 114 may receive a request to record an IM session history for the session initiated at element 402, such as from the IM client 108 or from the user via user interface module 304.

Once the IM session has been initiated, the IM history module 114 may record the IM session history throughout the IM session. At decision block 406, the IM history module 114 may determine whether an IM event has occurred. If an IM event has not occurred, flow chart 400 returns to decision block 406 to await the occurrence of an IM event. If an IM event has occurred, the IM history module 114 may determine a timestamp associated with the IM event at element 408. In one embodiment, the timestamp for an IM event should be determined to the level of a second or less. For an IM session that only includes text conversation, a timestamp accurate to a second or less may provide an acceptable level of fidelity, while for IM sessions that include animation such as input device movements, timestamp fidelity on the order to tens or hundreds of milliseconds may be more useful. Recording less fidelity for the timestamp accuracy than the times described herein (multiple seconds or longer) may also be used in exchange for less utility of the disclosed system. The fidelity of the timestamp may be a default value, configured by an administrator or user, or determined in any other fashion.

After determining the appropriate timestamp, the IM history module 114 may record an indication of the IM event and the timestamp in the IM history database 320 at element 410. In one embodiment, the IM event and the timestamp may be stored in a table located in the IM history database 320. In an alternative embodiment, the timestamps may be stored in a detailed version of a session transcript. The IM history module 114 may next determine if the IM session has terminated (or, alternatively, if the recording of the IM session has been terminated) at decision block 412. If the IM session or recording are terminated, the method of flow chart 400 may continue to element 414; otherwise, the method of flow chart 400 may return to decision block 406 for further processing of the next IM event.

Once one or more IM session histories are recorded, the IM history module 114 may receive a request to view an IM session history at element 414. The IM history module 114 may then launch an IM history player 322 to playback an IM session history for the user at element 416. At element 418, the IM history player 322 may receive playback commands from a user. Playback commands may include any instructions from the user as to the playback of one or more IM session histories, including traditional media content playback commands (e.g., play, fast forward, stop, pause, rewind, increase or decrease speed of playback, etc.), requests to playback one or more IM session histories, requests to compare IM session histories, history search requests, requests to bookmark or otherwise save a position in a history, etc. After receiving one or more playback commands, the IM history player 322 may at element 420 then display a playback of the IM session history in response to the playback commands. The IM history player 322 may determine at decision block 422 that playback will be continued and return to element 418 to await additional playback commands; otherwise, the method of flow chart 400 terminates.

In embodiments where input device movement is part of the recorded playback, the IM history player 322 may translate the input device movements as necessary to accommodate the size or configuration of the playback window (if it is different than the original window size during the IM session). The IM history player 322 may use the methodology described in relation to the input device movement translator 308, or may utilize an input device movement translator 308, to accomplish this task. A user, for example, who records her session with recorded gestures or other movements (performed by either the user or the person with whom she is conversing) may view a playback of that IM session in a different-sized window than she viewed the original session, possibly necessitating translation of the recorded input device movements to movements appropriate for the playback window size.

Figure 5:
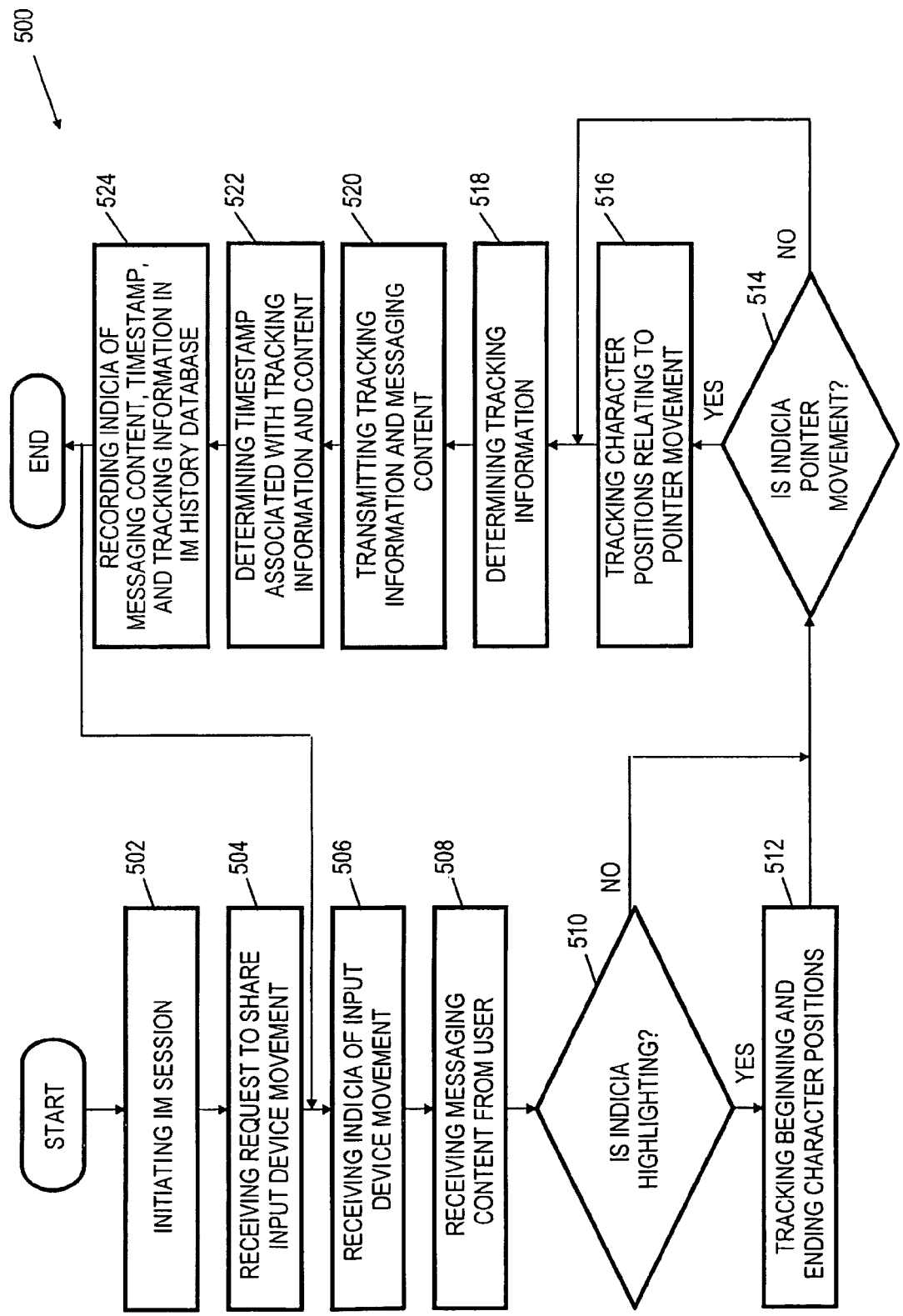
FIG. 5 depicts an example of a flow chart for determining tracking information relating to input device movement and recording the tracking information in an IM history database according to one embodiment.

The methodologies of FIGS. 5-7 may be applicable when input device movement is transmitted as part of an IM session. While the disclosed systems and methodologies are particularly useful when input device movement is a possible IM event, tracking of input device movement is not required for the disclosed systems and methodologies. FIGS. 5-7 and their associated description may therefore be considered an optional embodiment that illustrates the application of the disclosed system and methodology to a particular type of IM event.

Turning again to the figures, FIG. 5 depicts an example of a flow chart 500 for determining tracking information relating to input device movement and recording the tracking information in an IM history database according to one embodiment. The method of flow chart 500 may be performed, in one embodiment, by a client computer system 102 with an input device tracking module 306 and an IM history module 114. Flow chart 500 begins with element 502, where an IM client 108 may initiate an instant messaging session to start an instant messaging 'conversation'. The IM client 108 may, in one embodiment, initiate the session when a user of the IM client 108 either selects a contact with whom they desire to start a session or affirmatively responds to a request for a session from another user.

At element 504, the input device tracking module 306 may optionally receive a request to share input device movement with another user who is party to the instant messaging conversation. The input device tracking module 306 may receive an indicia of the input device movement from the user interface module 304 at element 506. Similarly, the IM client 108 may also receive any messaging content from the user interface module 304 at element 508. Messaging content may be text or other content (e.g., image files, sound files, etc.) the user inputs as part of an instant message.

After receiving a request to share input device movement at element 504 and the indicia of input device movement at element 506, the input device tracking module 306 determines how to track the input device movement. At decision block 510, the input device tracking module 306 may determine whether the received indicia relates to highlighting of text. If the indicia does relate to text highlighting, the input device tracking module 306 may track the beginning and ending character positions of the highlighted text at element 512. At decision block 514, the input device tracking module 306 may determine whether the received indicia relates to pointer movement. If the received indicia does relate to pointer movement, the method of flow chart 500 continues to element 516, where the input device tracking module 306 may track character positions relating to the mouse movement. In one embodiment, the input device tracking module 306 may track the characters or words in the instant messaging window that are closest to the beginning and end of each mouse movement. In further embodiments, the input device tracking module 306 may also track interim characters or words that the pointer passes over or near during its movement. In this embodiment, the actual path of the pointer movement may be more precisely tracked. In further embodiments, the time the pointer requires to move from one point to another may also be tracked so that the input device tracking module 306 may determine a velocity of the movement.

After the input device tracking module 306 has tracked the input device movement, it may next determine the tracking information based on the input device movement at element 518. Tracking information may be any information used to identify tracked input device movement, such as beginning or ending characters or words, times or velocity for movement, the type on input, the identity of the input device, the identity of a button selected, highlighting or ghost pointer emphasis, etc. The input device tracking module 306 may next at element 520 transmit the tracking information to the IM client 108 or the communications module 302 for transmittal. The tracking information may be transmitted separately from any messaging content, may be cached, or may be transmitted in a package with messaging content.

At element 522, the IM history module 114 may determine the timestamp associated with the tracking information and messaging content (similarly to element 408 of flow chart 400). To determine the timestamp associated with the messaging content, the IM history module 114 may simply use the time at which the messaging content was completed (i.e., the user pressed an 'Enter' or 'Return' key). To determine the timestamp associated with tracking information, a more sophisticated methodology may be required. In one embodiment, the movement may result in two timestamps, one for the beginning of the movement and one for the end of the movement (such as when highlighting text). In other embodiments, a more intricate movement may require more than two timestamps, such as when multiple positions in between the start and end points are recorded (such as cursor movement). One skilled in the art will recognize that any number of timestamps may be utilized for different aspects of an input device movement. After determining any timestamps, the method of flowchart 500 may continue to element 524, where the IM history module 114 may record an indication of the messaging content, tracking information, and the associated timestamps in the IM history database 320, after which the method either terminates or returns to element 506 for further processing.

FIG. 6 depicts an example of a flow chart 600 for receiving highlighting tracking information from another client computer system, displaying an equivalent movement to a user, and recording the equivalent movement in an IM history database according to one embodiment. The method of flow chart 600 may be performed, in one embodiment, by a client computer system 102 with an input device movement translator 308 and an IM history module 114. Flow chart 600 begins with element 602, where an IM client 108 may initiate an instant messaging session to start an instant messaging 'conversation' with another IM client 108 on a client computer system 102 with an input device tracking module 306.

The input device movement translator 308 may, at optional element 604, receive a request to display indicia of the other user's input device movement. The method of flow chart 600 may then continue to element 606, where the IM client 108 may receive messaging content from the sending client computer system 102 whose session was initiated at element 602. Similarly, the input device movement translator 308 may receive tracking information (through the communications module 302) from the sending client computer system 102 at element 608. As described previously, the tracking information and messaging content may be received as part of the same package, separately, or in any other fashion. The IM client 108 may display any received messaging content at element 610.

After receiving the tracking information, the input device movement translator 308 may next determine at decision block 612 whether the tracking information relates to highlighting of text by analyzing the tracking information. If the tracking information does not relate to highlighting, the method either terminates, returns to element 604 for continued processing, or optionally performs all or part of other methods (such as that of FIG. 7) for handling other types of input device movement besides highlighting. If the tracking information does relate to highlighting, the method of flow chart 600 continues to element 614, where the input device movement translator 308 may analyze the tracking information for beginning and ending characters associated with the highlighted text or other aspects of the highlighting, such as an indication of increased emphasis (e.g., different color, font, size, boldface, etc.). The input device movement translator 308 may work with the IM client 108 to display the highlighting (with any requested emphasis added) from the beginning character to the end character at element 616. The equivalent movement in the IM window for the recipient user may be simply the highlighting of the appropriate text in that window. In this fashion, the recipient user may see text highlighted by the sending user, allowing the users to communicate highlighting information via an instant messaging window. In one embodiment, the beginning and ending characters may be measured from the last character in the instant messaging window to increase accuracy in situations where the windows of different users are displaying different amounts of history (and thus text).

At element 618, the IM history module 114 may determine the timestamp associated with the tracking information and messaging content and at element 620, the IM history module 114 may record an indication of the messaging content, the tracking information, and any associated timestamps in the IM history database 320. Elements 618 and 620 may be substantially similar to elements 522 and 524, respectively, of FIG. 5 and the description will not be repeated in the interest of brevity. After recording the information, the method of flow chart 600 may either terminate or return to element 606 for continued processing.

FIG. 7 depicts an example of a flow chart 700 for receiving pointer movement tracking information from another client computer system, displaying an equivalent movement to a user, and storing the equivalent movement in an IM history database according to one embodiment. The method of flow chart 700 may be performed, in one embodiment, by a client computer system 102 with an input device movement translator 308 and an IM history module 114. Flow chart 700 begins with elements 702, 704, 706, 708, and 710, which may be substantially similar to elements 602, 604, 606, 608, and 610, respectively, of FIG. 6, and the discussion will not be repeated in the interest of brevity. The received tracking information at element 708 may include one or more characters or words associated with the beginning or end of an input device movement, times or velocity for any input device movement, interim characters or words associated with input device movement, or other information.

After receiving the tracking information, the input device movement translator 308 may next determine at decision block 712 whether the tracking information relates to pointer movement of text by analyzing the received tracking information. If the tracking information does not relate to pointer movement, the method either terminates, returns to element 704 for continued processing, or optionally performs all or part of other methods (such as that of FIG. 6) for handling other types of input device movement besides mouse movement. If the tracking information does relate to pointer movement, the method of flow chart 700 continues to element 714, where the input device movement translator 308 may analyze the tracking information for characters and/or words associated with the pointer movement. Characters and/or words associated with the pointer movement may include beginning, end, or interim characters and/or words. The input device movement translator 308 may also analyze the tracking information for other aspects of the mouse movement, such as the velocity of movement or a more precise movement path (with interim points).

After analyzing the tracking information, the input device movement translator 308 may at element 716 translate the tracking information into one or more incremental movement points associated with the recipient instant messaging window. In one embodiment, the incremental movement points may include only the beginning and end points of a movement. In other embodiments, the incremental movement points may include one or more points in between the beginning and ending points. The input device movement translator 308 may then work with the IM client 108 to display a moving pointer based on the incremental moving points at element 718. The pointer may, in some embodiments, be a 'ghost' pointer that is partially faded so the user does not confuse it with their own pointer. Other types and configurations of the pointer may be used, including different shapes (e.g., arrows), colors, sizes, intensities, etc. In an alternative embodiment, the pointer may be emphasized similarly to the highlighting of FIG. 6, such as by making the ghost pointer flashing, increasing in size, etc.

In this fashion, the recipient user may see equivalent movement via their instant messaging window to any mouse or pointer movement by the sending user. The input device movement translator 308 may accomplish this by utilizing the start and end characters' positions (measuring backwards from the end of the window) of the recipient window to match the same characters in the sending IM window. In one example, if a sending user moved their pointer over the $5^{th}$ word and moved it up three lines and to the right to the 70$^{th}$ word, the input device movement translator 308 can recreate that motion by moving a ghost pointer from the 5$^{th}$ word to the 70$^{th}$ word in its window, even if those words are located in different places within the window. The input device movement translator 308, by relying on character or word locations instead of geometric position, can thus accommodate differences in window sizes, text sizes, amounts of history, etc., between the sender and recipient window. If the recipient user's instant messaging window is much narrower than the sending user's window, for example, an equivalent movement may be steeper on the recipient's window (while still starting and ending on the same characters or words). In one embodiment, if the sender and recipient user's windows are different sizes and the equivalent movement would result in scrolling of the recipient window, the input device movement translator 308 may either automatically scroll the IM window or allow the pointer to 'bump' the edge of the IM window. An administrator or user may, in some embodiments, configure how the input device movement translator 308 handles such a situation.

At element 720, the IM history module 114 may determine the timestamp associated with the tracking information and messaging content and at element 722, the IM history module 114 may record an indication of the messaging content, the tracking information, and any associated timestamps in the IM history database 320. Elements 720 and 722 may be substantially similar to elements 522 and 524, respectively, of FIG. 5 and the description will not be repeated in the interest of brevity. After recording the information, the method of flow chart 700 may either terminate or return to element 706 for continued processing.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for playback of an instant messaging session history. It is understood that the form of the invention shown and described in the detailed description and the drawings are to be taken merely as examples. It is intended that the following claims be interpreted broadly to embrace all the variations of the example embodiments disclosed.

What is claimed is:

1. A method for playing back an instant messaging session, the method comprising:

during an instant messaging session between a first application and a second application, where one or more instant messaging events occur, determining a timestamp associated with the one or more instant messaging events;

recording an indication of the one or more instant messaging events and timestamps associated with each of the one or more instant messaging events, wherein the one or more instant messaging include an input device movement, wherein the input device movement comprises highlighting a text in the first application, and wherein the input device movement tracks a first character and a last character of the text being highlighted, wherein the first and the second applications present different views of the instant messaging session, and wherein the input device movement as made on the first application is translated using a first translation to perform an equivalent movement on the second application;

receiving one or more playback commands; and in response to the received playback commands, displaying playback of at least part of the instant messaging session having the one or more instant messaging events, wherein the playback of the one or more instant messaging events is based on the timestamps associated with each of the one or more instant messaging events.

2. The method of claim 1, wherein the displaying the playback occurs on a third application, the third application being configured differently from the second application for displaying the at least part of the instant messaging session, and wherein the displaying the playback on the third application includes a second translation of the input device movement to perform a second equivalent movement on the third application.

3. The method of claim 2, wherein the third application is configured differently from the second application in that a window size of the third application is different from a second window size of the second application.

4. The method of claim 1, wherein the highlighting comprises tracking special emphasis, the special emphasis including one of changing a color of the text being highlighted, changing a font of the text being highlighted, and changing a size of the text being highlighted.

5. The method of claim 1, wherein the first translation includes tracking a speed of the input device movement on the first application to perform an equivalent speed in the equivalent movement on the second application.

6. A computer program product allowing replay of an instant messaging session, the computer program product comprising:

one or more computer-readable tangible storage devices;

program instructions, stored on at least one of the one or more storage devices, during an instant messaging session between a first application and a second application, where one or more instant messaging events occur, to determine a timestamp associated with the one or more instant messaging events;

program instructions, stored on at least one of the one or more storage devices, to record an indication of the one or more instant messaging events and timestamps associated with each of the one or more instant messaging events, wherein the one or more instant messaging events include an input device movement, wherein the input device movement comprises highlighting a text in the first application, and wherein the input device movement tracks a first character and a last character of the text being highlighted, wherein the first and the second applications present different views of the instant messaging session, and wherein the input device movement as made on the first application is translated using a first translation to perform an equivalent movement on the second application;

program instructions, stored on at least one of the one or more storage devices, to receive one or more playback commands; and program instructions, stored on at least one of the one or more storage devices, in response to the received playback commands, to display playback of at least part of the instant messaging session having the one or more instant messaging events, wherein the playback of the one or more instant messaging events is based on the timestamps associated with each of the one or more instant messaging events.

7. The computer program product of claim 6, wherein the program instructions to display the playback cause the display to occur on a third application, the third application being configured differently from the second application for displaying the at least part of the instant messaging session, and wherein displaying the playback on the third application includes a second translation of the input device movement to perform a second equivalent movement on the third application.

8. The computer program product of claim 7, wherein the third application is configured differently from the second application in that a window size of the third application is different from a second window size of the second application.

9. The computer program product of claim 6, wherein the highlighting comprises tracking special emphasis, the special emphasis including one of changing a color of the text being highlighted, changing a font of the text being highlighted, and changing a size of the text being highlighted.

10. The computer program product of claim 6, wherein the first translation further includes tracking a speed of the input device movement on the first application to perform an equivalent speed in the equivalent movement on the second application.

11. A computer system allowing replay of an instant messaging session, the system comprising:

one or more processors, one or more computer-readable memories and one or more computer-readable tangible storage devices;

program instructions, stored on at least one of the one or more storage devices for execution by at least one of the one or more processors via at least one of the one or more memories, during an instant messaging session between a first application and a second application, where one or more instant messaging events occur, to determine a timestamp associated with the one or more instant messaging events;

program instructions, stored on at least one of the one or more storage devices for execution by at least one of the one or more processors via at least one of the one or more memories, to record an indication of the one or more instant messaging events and timestamps associated with each of the one or more instant messaging events, wherein the one or more instant messaging events include an input device movement, wherein the input device movement comprises highlighting a text in the first application, and wherein the input device movement tracks a first character and a last character of the text being highlighted, wherein the first and the second applications present different views of the instant messaging session, and wherein the input device movement as made on the first application is translated using a first translation to perform an equivalent movement on the second application;

program instructions, stored on at least one of the one or more storage devices for execution by at least one of the one or more processors via at least one of the one or more memories, to receive one or more playback commands; and program instructions, stored on at least one of the one or more storage devices for execution by at least one of the one or more processors via at least one of the one or more memories, in response to the received playback commands, to display playback of at least part of the instant messaging session having the one or more instant messaging events, wherein the playback of the one or more instant messaging events is based on the timestamps associated with each of the one or more instant messaging events.

12. The system of claim 11, wherein the program instructions to display the playback cause the display to occur on a third application, the third application being configured differently from the second application for displaying the at least part of the instant messaging session, and wherein displaying the playback on the third application includes a second translation of the input device movement to perform a second equivalent movement on the third application.

13. The system of claim 12, wherein the third application is configured differently from the second application in that a window size of the third application is different from a second window size of the second application.

14. The system of claim 11, wherein the highlighting comprises tracking special emphasis, the special emphasis including one of changing a color of the text being highlighted, changing a font of the text being highlighted, and changing a size of the text being highlighted.

15. The system of claim 11, wherein the first translation further includes tracking a speed of the input device movement on the first application to perform an equivalent speed in the equivalent movement on the second application.

16. A computer program product comprising one or more computer-readable tangible storage devices and computer-readable program instructions stored on the one or more storage devices, the computer-readable program instructions, when executed by one or more processors, perform the method of claim 1.

17. A computer system comprising one or more processors, one or more computer-readable memories, one or more computer-readable, tangible storage devices and program instructions stored on the one or more storage devices for execution by the one or more processors via the one or more memories, the program instructions, when executed by the one or more processors, perform the method of claim 1.

* * * * *